United States Patent Office 3,009,946
Patented Nov. 21, 1961

3,009,946
PROCESS FOR PREPARING CHRYSANTHEMUM-DICARBOXYLIC ACID AND ESTERS THEREOF
Sankichi Takei, Kyoto, Minoru Ohno and Yuzo Inouye, Toyonaka-shi, and Toshio Sugita, Shizuoka-shi, Japan, assignors to The Institute of Insect Control, Kyoto, Japan, a corporation of Japan
No Drawing. Filed Feb. 27, 1959, Ser. No. 795,904
Claims priority, application Japan Mar. 10, 1958
9 Claims. (Cl. 260—468)

This invention relates to processes for preparing chrysanthemum-dicarboxylic acid and esters thereof. More particularly, the invention is concerned with a process for preparing said acid and esters by the reaction of α-methylmuconic acid or its ester with dimethyldiazomethane.

It is well known that "pyrethrins," the insecticidal component of pyrethrum flowers, include pyrethrin-I, pyrethrin-II, cinerin-I, and cinerin-II as the principal effective constituents, that these constituents are esters of cyclopentenolones, and that pyrethrin-I and cinerin-I, among these, have chrysanthemum-monocarboxylic acid, and pyrethrin-II and cinerin-II have chrysanthemum-dicarboxylic acid as their acid components as shown by the following:

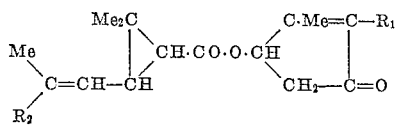

Pyrethrin-I: $R^1$=cisCH$_2$CH=CH·CH=CH$_2$, $R^2$=Me.
Pyrethrin-II: $R^1$=cisCH$_2$CH
    =CH·CH=CH$_2$, $R^2$=CO$_2$Me.
Cinerin-I: $R^1$=cisCH$_2$CH=CH·Me, $R^2$=Me.
Cinerin-II: $R^1$=cisCH$_2$CH=CH·Me, $R^2$=CO$_2$Me.

The chemical structures of such constituents have already been decided and their total syntheses have further been accomplished. From the commercial standpoint, esters have been produced from synthetic chrysanthemum-monocarboxylic acid and certain synthetic cyclopentenolones, such as allethrolone, and are commercially available as a synthetic insecticide. Although such synthetic insecticides derived from chrysanthemum-monocarboxylic acid exhibit very lethal effects to insects, they are far behind natural pyrethrum extract with respect to a quick knock down effect that is regarded as one of the characteristics which is not observed in other insecticides. This is due to the fact that the acid component constituting such synthetic insecticides differs from natural pyrethrum extract in being merely chrysanthemum-monocarboxylic acid and is lacking in chrysanthemum-dicarboxylic acid. Accordingly, it is known and has been proved by biological tests, that to improve such synthetic insecticides, which contain only chrysanthemum-monocarboxylic acid as their acid component, by mere quantitative replenishment is impossible. For endowing the chrysanthemum-monocarboxylates now produced commercially with both excellent insecticidal quick knock down and killing effects comparable to natural pyrethrum preparations, it is necessary to synthesize chrysanthemum-dicarboxylic acid in a commercially practical procedure wherein chrysanthemum-dicarboxylic acid is substituted for a part or all of the chrystanthemum-monocarboxylic acid.

Certain stereoisomers of chrysanthemum-dicarboxylic acid have been synthetized as shown by the following and their geometrical structures and relations with naturally occurring chrysanthemum-monocarboxylic acid have already been established. (See Y. Inouye, Y. Takeshita and M. Ohno; Bull. Inst. Chem. Res. Kyoto Univ., 1955, 33, 73; Bull. Agr. Chem. Soc. Japan, 1955, 19, 193.)

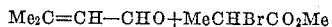

Zn | in benzene

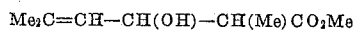

—H$_2$O | P$_2$O$_5$ (or P O Cl$_3$)

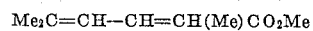

N$_2$CHCO$_2$Et | Cu

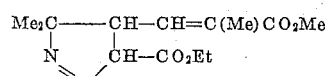

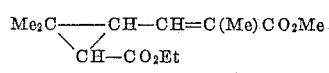

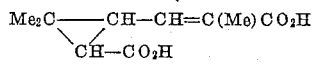

Furthermore, Harper et al. (Chem. Ind., 1954, 1538) have obtained a geometrical isomer of chrysanthemum-dicarboxylic acid by the above technique. Recently Matsui et al. (Bull. Agr. Chem. Soc. Japan, 1957, 21, 22) have obtained isomeric acids by oxidation of chrysanthemum-monocarboxylic acid with selenium dioxide followed by oxidation with silver oxide. However, no experimental evidence has, so far, been available as to the configuration of the side chain double bond of the acids synthesized by these two groups of workers.

These methods, however, amount to no more than laboratory methods in yield and procedure, and there yet remains room for improvements resulting in a commercially practical process. Further, in the former methods, it is impossible to obtain any geometrically pure chrysanthemum-dicarboxylic acid.

In accordance with the present invention, a process is provided for preparing chrysanthemum-dicarboxylic acid and esters thereof by easily workable and controllable reactions with commercially available procedures, excluding the aforesaid defects of the old methods.

It is therefore an object of the present invention to provide an improved process for obtaining chrysanthemum-dicarboxylic acid and esters thereof. It is a further object of the invention to provide a process for obtaining commercially any geometrically specific chrysanthemum-dicarboxylic acid or its ester without being contaminated by other isomers. Other objects and advantages of the invention will be apparent from the following detailed description.

To attain the above-stated objects, there is provided in the present invention a process for preparing esters of chrysanthemum-dicarboxylic acid, which comprises contacting a compound of the formula, I.     RO$_2$C—CH=CH—CH=CMe—CO$_2$R' in which R and R' are respectively a member selected from the group consisting of hydrogen, and methyl and ethyl radicals, with dimethyldiazomethane, heating the resulting intermediate pyrazoline derivative until denitrogenation is substantially complete, and thereafter recovering the resulting ester of chrysanthemum-dicarboxylic acid. The process of the invention may be represented by the following equations:

(I)  $RO_2C—CH=CH—CH=C(Me)CO_2R'$

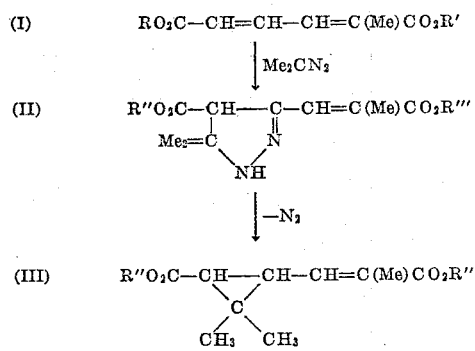

(II)  $R''O_2C—CH—C—CH=C(Me)CO_2R'''$ with $Me_2=C$, $N$, $NH$ $|-N_2$ (III)  $R''O_2C—CH—CH—CH=C(Me)CO_2R'''$ with $\underset{CH_3 \ CH_3}{C}$ wherein R and R' have the same meanings as indicated above, and R'' and R''' are respectively a radical of the group consisting of methyl, ethyl, and isopropyl.

The chrysanthemum-dicarboxylic acid esters prepared by the invention may be processed to form free chrysanthemum-dicarboxylic acid by conventional hydrolyzing method after being taken out of the reaction system and purified, or without being taken out.

The existence of four stereoisomers is known in chrysanthemum-dicarboxylic acid and its esters with respect to the trimethylene ring and the double bond, namely trans, trans, cis, cis, trans, cis, and cis, trans. According to the invention, now, substantially pure trans, trans- or trans, cis-chrysanthemum-dicarboxylic acid or its esters can be obtained from among these isomers, without its being contaminated with other isomers, by appropriate selection of stereoisomers of the starting material α-methyl-muconic acid or its ester. The latter isomer, trans, cis-chrysanthemum-dicarboxylic acid could not have been synthesized by any known method. (As to the representation of stereoisomerism of chrysanthemum-dicarboxylic acid and its esters, first the geometrical structure at the cyclopropane ring, and then at the side chain double bond are referred to. Against this, in α-methylmuconic acid or its derivatives, first the geometrical structure at the double bond having carbon atom attached with methyl group, and then at the other double bond are referred to. That is to say, the represented sequence of the geometrical structures of the present starting material is the inverse of that of the product acid or esters.)

As to α-methylmuconic acid employed in the present invention, Kuhn and Michel (Ber. der Deutsch. Chem. Gesel., 1938, 71, 1119) have prepared an isomer of the acid by condensation of ethyl tiglate with ethyl oxalate, followed by acetylation and hydrolysis. However, the geometrical configuration of the acid has not yet been confirmed.

Applicants have reported (Bull. Agr. Chem. Soc,. Japan, 1958, 22, 162–168) a novel method for obtaining exceedingly advantageously α-methylmuconic acid of any geometrical configuration which is preferably employed in the invention. According to the findings of the applicants, the oxidation of o-cresol with peracetic acid gives α-methyl-cis, cis-muconic acid. Further, α-methyl-cis, trans-muconic acid has been produced, as shown in the following equations:

(IV) cis, cis  $HO_2C—CH=CH—CH=CMe—CO_2H$

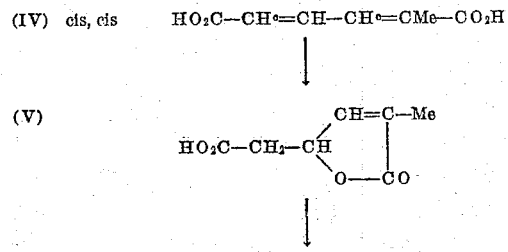

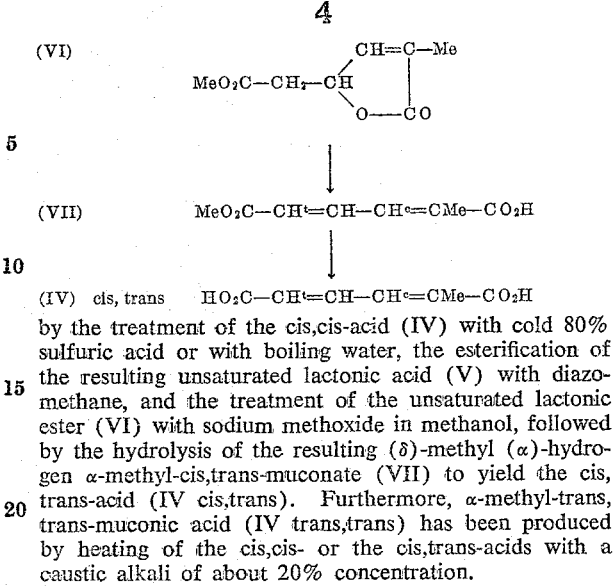

(VII)  $MeO_2C—CH=CH—CH=CMe—CO_2H$ (IV) cis, trans  $HO_2C—CH=CH—CH=CMe—CO_2H$ by the treatment of the cis,cis-acid (IV) with cold 80% sulfuric acid or with boiling water, the esterification of the resulting unsaturated lactonic acid (V) with diazomethane, and the treatment of the unsaturated lactonic ester (VI) with sodium methoxide in methanol, followed by the hydrolysis of the resulting (δ)-methyl (α)-hydrogen α-methyl-cis,trans-muconate (VII) to yield the cis, trans-acid (IV cis,trans). Furthermore, α-methyl-trans, trans-muconic acid (IV trans,trans) has been produced by heating of the cis,cis- or the cis,trans-acids with a caustic alkali of about 20% concentration.

It is needless to say that, although any geometrically isomeric α-methylmuconic acid used in the present invention may conveniently be produced by the aforementioned processes, other processes are not excluded for use in the invention.

α-Methylmuconic acid may be esterified by any conventional method to give an ester of α-methylmuconic acid, the starting material of the invention. Thus, the ester may be prepared by treatment of the acid with an alcohol saturated with dry hydrogen chloride or with a mixture of an alcohol with sulfuric acid. In case the objective ester is methyl ester, methylation with diazomethane may be conducted. It will be obvious that such a half ester as obtained in the course of producing the α-methylmuconic acid, for example as (δ)-methyl (α)-hydrogen α-methyl-cis,trans-muconate (VIII), may directly be esterified to give the diester.

Any alcohol or phenol may be employed for esterification with α-methylmuconic acid, but lower aliphatic alcohols such as methyl, ethyl, n-propyl, isopropyl, butyl (involving normal, iso, secondary, and tertiary butyl) alcohols, more particularly methyl, ethyl and isopropyl alcohols, are preferable. Of course, α-methylmuconate having the same ester groups or different may be used in the present invention.

Dimethyldiazomethane employed in the invention may be prepared by means of any known method. For example, according to the report of Guha and Sankaran (Ber. der Deutsch. Chem. Gesel., 1937, 70, 1688), acetone-hydrazone is dissolved in xylene and yellow mercuric oxide is slowly added therein, the temperature of the reaction being kept at a lower temperature (e.g. from 0° to 10° C.). The resulting solution of dimethyldiazomethane in xylene has a pink color and contains mercury and/or mercurous oxide precipitated at the bottom of the reaction vessel. As the mercury and/or mercurous oxide produced in the reaction are not an obstacle to the next reaction of this reagent with α-methylmuconate, it is not necessary to remove immediately the by-products. The next reaction of the invention may be effected either without or after removal of the by-products.

Dimethyldiazomethane employed in the invention is ordinarily obtained in a form of solution, and can be used as it is. Therefore, the solvent of dimethyldiazomethane may be the solvent employed in the present invention. Among such solvents are involved, besides the above-stated xylene, aromatic hydrocarbons, such as benzene, toluene, and the like, saturated aliphatic hydrocarbons, saturated aliphatic ethers, such as diethyl ether, and others.

The reaction of α-methylmuconic acid or its esters with dimethyldiazomethane is carried out by contacting the both compounds generally in such solvent as abovementioned. For this purpose, it is preferable to add α-methylmuconic acid or its ester to a cooled solution of dimethyldiazomethane which has just been prepared. α-methylmuconic acid or its ester may be added to the solution as a powdered solid form or as a solution dissolved in, or a suspension dispersed in the same solvent as, or a different medium than, the solvent of the dimethyldiazomethane.

Because dimethyldiazomethane is an unstable gaseous compound, the reaction with the above-stated material should be carried out at as low temperature as possible, for example, α-methylmuconic acid or its ester with or without solvent may be added to a solution of dimethyldiazomethane cooled to, e.g., +5° to −20° C., and the mixture is permitted to stand at about +5° to about 0° C., by way of example, for about one night. The advance of the reaction can be noted by the disappearance of the pink color of the reaction mixture.

Dimethyldiazomethane to be reacted with α-methylmuconic acid ester in accordance with the invention is used in an amount corresponding to at least 1 mole per mole of α-methylmuconic acid ester. Not less than 1.2 moles, preferably from 1.5 to 3.0 moles, of acetone-hydrazone per mole of α-methylmuconic acid ester is preferably used to insure the complete reaction, because of the difficulty in converting acetone-hydrazone into dimethyldiazomethane with a good quantitative yield. An amount greater than 3.0 moles is operative, but there are no additional benefits.

From the reaction mass thus obtained, after removal of mercury and/or mercurous oxide, if they are present, the pyrazoline derivative (II) can be obtained by removal of the solvent. Denitrogenation of the pyrazoline derivative may be carried out by heating or distilling it at a temperature up to about 200° C., but it may be carried out even at lower temperatures such as from room temperature to as high as 170° C. in the presence of a catalyst such as metallic copper and a cuprous compound (e.g. anhydrous cupric sulfate). It is preferable to carry out the denitrogenation reaction by heating the pyrazoline derivative (II) or the reaction product containing said derivative (II) in the presence of this catalyst without solvent, although the reaction in the presence of solvent may be operative if the solvent is durable at the temperature of the denitrogenation reaction because the presence of the solvent exhibits no deleterious effect to the reaction. Thus, the reaction liquid containing pyrazoline derivative (II) and obtained by the reaction of α-methylmuconic acid or its ester with dimethyldiazomethane may, if desired or if required, be directly subjected to the denitrogenation reaction.

From the reaction product, after the denitrogenation is substantially complete, the catalyst and/or the solvent are removed, if present, and then chrysanthemum-dicarboxylic acid ester may be recovered by, for example, distillation in vacuo.

As a modification of the present invention, also, free α-methylmuconic acid may be used instead of its ester, and contacted directly with dimethyldiazomethane, whereby the acid is converted to the diisopropyl ester and simultaneously the present reaction takes place. In this case, it is necessary to employ a sufficient amount of acetone-hydrazone to produce at least 3.0 moles of dimethyldiazomethane per mole of α-methylmuconic acid.

The reaction mechanism of the process of this invention may be explained as follows, although the inventors are not to be limited to this explanation.

There are few reports on the mechanism of the addition reaction of aliphatic diazo compounds to compounds having conjugated double bonds system. Guha and Sankaran (Ber. der Deutsch. Chem. Gesel., 1937, 70, 2109) have stated that, when ethyl muconate is contacted with dimethyldiazomethane or diazomethane, 2,2-dimethylcyclopent-4-ene-1,3-dicarboxylate or cyclopent-4-ene-1,3-dicarboxylate respectively is obtained through 2,5-addition. However, α-methylmuconate has no molecular symmetry unlike muconate and contains methyl group substituted at alpha-carbon, so that the polarization of the αβ-double bond induced by the α-carboxyl group is weakened, compared with that of the γδ-double bond. The same mechanism as that experienced in the synthesis of chrysanthemum-dicarboxylic acid from methyl αδ-dimethylsorbate and ethyl diazoacetate can be adapted to this invention, dimethyldiazomethane adding selectively to the γδ-double bond of α-methylmuconic acid ester to yield the pyrazoline derivative (II) according to the process of the invention.

The chemical structure of the intermediate pyrazoline derivatives (II) in this invention were identified by analysis of the infrared spectrum. However, the intermediate pyrazoline derivative of the invention is not to be limited to the formula described herein. As far as the intermediates are addition products of α-methylmuconate and dimethyldiazomethane and form chrysanthemum-dicarboxylic acid ester by denitrogenation, they are within the scope of the invention.

The esters of chrysanthemum-dicarboxylic acid obtained may be hydrolyzed by a conventional method to yield free chrysanthemum-dicarboxylic acid. When the free acid is contemplated, the reaction product containing an ester of chrysanthemum-dicarboxylic acid which is obtained after denitrogenation of the pyrazoline derivative, may directly be hydrolyzed to give the free acid.

The process for preparing chrysanthemum-dicarboxylic acid and its esters in accordance with the invention is excellent not only in respect to the materials employed and procedures, but in being able to obtain a chrysanthemum-dicarboxylic acid or its ester of any desired geometrical configuration or its mixture by use of an α-methylmuconic acid or its ester of suitable geometrical configuration or mixtures thereof. Thus, trans,trans-chrysanthemum-dicarboxylic acid ester can be obtained when α-methyl-trans,trans- or trans,cis-muconic acid or its ester is used as the starting material. In the same manner, α-methyl-cis,trans- or -cis,cis-muconic acid or its ester is converted into trans,cis-chrysanthemum-dicarboxylic acid ester.

If required, these synthetic chrysanthemum-dicarboxylic acids may be optically resolved. The resolution of dl-trans,trans-chrysanthemum-dicarboxylic acid obtained in accordance with the invention gives d-trans,trans- and l-trans,trans-chrysanthemum-dicarboxylic acids, the former of which agrees with natural chrysanthemum-dicarboxylic acid and the latter of which is proved to be the antipode.

Dialkyl chrysanthemum-dicarboxylate of various steric configurations obtained by this invention can be partially hydrolysed to yield the monoalkyl ester. This method for obtaining such monoalkyl ester is, for example, to hydrolyze the dialkyl ester with at most 1 equivalent or slightly excess of alkali in an alcohol which has preferably the same alkyl group as that constituting the ester, under weak reaction conditions, that is, for a short period or at a temperature not greatly elevated. Monoalkyl ester of chrysanthemum-dicarboxylic acid given by such partial hydrolysis presumably comprises the compound shown by the following formula as its principle part,

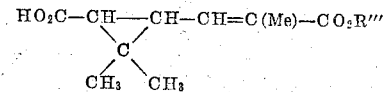

wherein R''' is methyl, ethyl, or isopropyl group. The reason is that the inventors have proved that an ester of allethrolone and the alternative monoalkyl ester, namely, that which has alkoxy-carbonyl group directly attached to the trimethylene ring and carboxyl group attached to the side chain, exhibits no insecticidal effect, and that, on the contrary, an ester of allethrolone and the above-described monoalkyl ester exhibits insecticidal effect. Among these monoalkyl chrysanthemum-dicarboxylates, the monomethyl ester, which is particularly preferable with respect to insecticidal power, is known as pyrethric acid.

The monoalkyl chrysanthemum-dicarboxylate, more particularly pyrethric acid, may be esterified with a cyclopentenolone derivative of the formula,

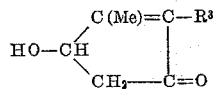

wherein $R^3$ is a hydrocarbon radical or the same having a heterocyclic group, to give a synthetic insecticide. Within these cyclopentenolone derivatives, pyrethrolone ($R^3$=pentadienyl), cinerolone ($R^3$=butenyl), allethrolone ($R^3$=allyl), cyclethrolone ($R^3$=cyclopentenyl), and furethrolone ($R^3$=furfuryl) are desirable.

For esterification of the monoalkyl chrysanthemum-dicarboxylate with the cyclopentenolone derivative, any known condition for esterification of chrysanthemum-monocarboxylic acid can be applied correspondingly.

Some testing data of the insecticidal effect, using the common house fly, of the synthetic insecticide obtained by esterification of pyrethric acid of the invention with allethrolone, that is, allethronyl pyrethrate or allethrin-II, will be tabulated hereunder.

| Samples | Knockdown percent after 30 min. | Kill percent after 24 hrs. |
| --- | --- | --- |
| Allethrin | 90.28 | 79.17 |
| Allethronyl pyrethrate | 91.14 | 81.01 |
| Do | 89.74 | 74.36 |

The tests are carried out by topical application method using micro-syringe. The concentrations of the samples are each 0.0625% in acetone. The allethrine is of α-dl-trans form and of almost pure, but the allethrolonyl pyrethrates tested are of approximately 60% purity, measured by polarographic analysis.

In order that those skilled in the art may better understand how the present invention can be carried into effect, the following examples are given by way of illustration and not by way of limitation. All percentages are by weight unless otherwise stated. The melting points and boiling points are uncorrected.

EXAMPLE 1

*Dimethyl α-methyl-cis,cis-muconate*

α-*methyl-cis,cis-muconic acid.*—A mixture of 73.5 g. (0.68 mole) of o-cresol and 790 ml. of 13% peracetic acid solution (1.36 moles of peracetic acid) was cooled in an ice bath for 24 hours and then kept cold for a week to give the pure α-methyl-cis,cis-muconic acid in prisms, M.P. 189–90° C. (this melting point was taken from a bath at 160° C., with the temperature rising 10° C. per minute, since it varies with the rate of heating), $\lambda_{max.}$ 269 m$\mu$, ε 20,700. (Analysis. Found: C, 53.73; H, 5.26%. Calculated for $C_7H_8O_4$: C, 53.84; H, 5.16%), the yield being 12.3 g. (11.3% of theory).

*Dimethyl α-methyl-cis,cis-muconate.*—The cis,cis-acid was treated with ethereal diazomethane solution in the usual manner and the dimethyl ester was obtained in the yield almost quantitative. After recrystallization from light petroleum (B.P. 40–50° C.), it formed prisms, M.P. 35° C., $\lambda_{max.}$ 270 m$\mu$, ε 24,800. (Analysis. Found: C, 58.70; H, 6.80%. Calculated for $C_9H_{12}O_4$: C, 58.69; H, 6.57%.)

EXAMPLE 2

*Dimethyl α-methyl-cis,trans-muconate*

γ-*Carboxymethyl-α-methyl - Δα - butenolide (V).*—(a) A 3.62 g. quantity of the cis,cis-acid was shaken with 36 ml. of cold 80% sulfuric acid for 1 hour. After 24 hours standing, the reaction mixture was poured onto ice and the bulk of the acid was neutralized with an aqueous ammonia (acid to Congo-red). The solution was thoroughly extracted with ether. After removal of ether, the product was recrystallized from chloroform to yield the lactonic acid (V) in prisms, M.P. 105–6° C. (Analysis. Found: C, 53.60; H, 5.34%. Calculated for $C_7H_8O_4$: C, 53.84; H, 5.16%), the yield being 3.08 g. (b) A 0.75 g. quantity of the cis,cis-acid was heated with water under reflux for 1 hour. The reaction mixture was dried up on a water bath and the residue was recrystallized from ethyl acetate to yield γ-carboxymethyl-α-methyl-Δα-butenolide (V), M.P. 105° C. (Analysis. Found: C, 53.88; H, 5.03%. Calculated for $C_7H_8O_4$: C, 53.84; H, 5.16%.) The mixed melting point was the product of the procedure (a) was 105° C. The yield was 0.60 g.

γ-*Carbomethoxymethyl - α - methyl - Δα - butenolide (VI).*—To 9.21 g. (0.059 mole) of the lactonic acid (V) in ether was added an ethereal solution of diazomethane (0.065 mole) under cooling and well stirred. The product was then distilled under reduced pressure to give the lactonic ester (VI), B.P. 150–1° C./9 mm., $n_D^{20}$ 1.4741. The yield was 9.28 g.

(δ)-*Methyl (α)-hydrogen α-methyl-cis,trans - muconate (VII).*—To 5.09 g. (0.0299 mole) of the unsaturated lactonic ester (VI) in 50 ml. of methanol, was added 12.5 ml. of methanolic sodium methoxide (2.39 N). After 15 minutes, the solution was evaporated under reduced pressure. Fifty milliliters of water was added and the solution was acidified with hydrochloric acid, whereupon methyl hydrogen α-methyl-cis, trans-muconate separated, which was recrystallized from benzene in prismatic needles, M.P. 121° C., $\lambda_{max.}$ 275 m$\mu$, ε 22,000. (Analysis. Found: C, 56.53; H, 5.98%. Calculated for $C_8H_{10}O_4$: C, 56.46; H, 5.92%), the yield was 4.60 g.

α-*Metthyl-cis,trans-muconic acid.*—A 1.50 g. quantity of the preceding half-ester (VII) was warmed with 17.6 ml. of 1 N sodium hydroxide on a steam bath for 1 hour. After the duration, the solution was acidified with hydrochloric acid, the separated crystals were recrystallized from methanol and then from ethyl acetate to yield the cis,trans-acid in plates, M.P. 172° C., $\lambda_{max.}$ 269 m$\mu$, ε 25,700. (Analysis. Found: C, 53.87; H, 5.23%. Calculated for $C_7H_8O_4$: C, 53.84%, H, 5.16%.) The yield was 1.35 g.

*Dimethyl α-methyl-cis,trans-muconate.*—Treatment of the methyl hydrogen α-methyl-cis,trans-muconate (VII) with ethereal diazomethane, and evaporation of the solution afforded the dimethyl ester which, after recrystallization from methanol, formed prisms, M.P. 60° C., $\lambda_{max.}$ 272 m$\mu$, ε 27,600. (Analysis. Found: C, 58.84; H, 6.70%. Calculated for $C_9H_{12}O_4$: C, 58.69; H, 6.57%.) The same dimethyl ester was also obtained by the same procedue from the above cis,trans-acid.

EXAMPLE 3

*Dimethyl α-methyl-trans,trans-muconate*

α-*Methyl-trans,trans-muconic acid.*—(a) α-Methyl-cis, cis-muconic acid was heated with 30 ml. of 20% aqueous sodium hydroxide for 4 hours. The solution was cooled and acidified with dilute sulfuric acid. The separated precipitate was recrystallized from methanol to yield the trans,trans-acid in prisms, M.P. 273° C. (Kuhn and Michel; Ber. der Deutsch. Chem. Gesel., 1938, 71, 1119, recorded M.P. 276° C.), $\lambda_{max.}$ 273 m$\mu$, ε 29,700. (Analysis. Found: C, 54.00; H, 5.29%. Calculated for $C_7H_8O_4$: C, 53.84; H, 5.16%.) The yield was 0.45 g. (b) α-Methyl-cis,trans-muconic acid gave exactly the same acid by the same procedures as mentioned above.

*Dimethyl α-methyl-trans,trans-muconate.*—The esterification of the trans,trans-acid with diazomethane gave the dimethyl ester in plates (from methanol), M.P. 55.5° C., $\lambda_{max.}$ 275 m$\mu$, ε 31,000. (Harris and Binns; Nature, 1957, 179, 475, reported M.P. 46–7° C., $\lambda_{max.}$ 276 m$\mu$, log ε 4.17.) (Analysis. Found: C, 58.51; H, 6.87%. Calculated for $C_9H_{12}C_4$: C, 58.69; H, 6.57%.)

EXAMPLE 4

Diethyl α-methylmuconate

A mixture of 5 g. of α-methyl-trans,trans-muconic acid, 100 ml. of ethanol saturated with dry hydrogen chloride gas at 0° C., was refluxed for 1 hour. Then the ethanol and hydrogen chloride were removed at reduced pressure and the residue was dissolved in ether. After washing of the ether solution with saturated aqueous sodium bicarbonate solution, drying of the ether layer, and removal of the ether, diethyl α-methyl-trans,trans-muconate was obtained at B.P. 119–120° C./0.5 mm., $n_D^{20}$ 1.5092.

With the procedure similar with the above-described, diethyl α-methyl-cis,trans-muconate, B.P. 120–123° C./0.5 mm., $n_D^{20}$ 1.5254, and diethyl α-methyl-cis,cis-muconate, B.P. 115–116° C./0.5 mm., $n_D^{20}$ 1.5348, were obtained.

EXAMPLE 5

To a solution of 53 g. (0.73 mole) of acetone-hydrazone dissolved in 160 g. of dry xylene and kept at a temperature of from −10° to −20° C., was slowly added 200 g. of yellow mercuric oxide with efficient stirring. The solution became pink by formation of dimethyldiazomethane. To the solution kept at −18° C. was added 49 g. (0.27 mole) of dimethyl α-methyl-trans,trans-muconate, M.P. 55.5° C., prepared according to Example 3 with stirring. The cooling and stirring were continued for about 3 hours, and then the solution was stood still for 15 hours. The by-produced mercury and mercurous oxide were filtered off and washed with methanol. The filtrate and washings were combined and evaporated in vacuo. Pyrazoline derivative (II, R″ and R‴=Me) was obtained as leaflets, M.P. 144–5° C., the yield being 34.5 g. (51% of theory). (Analysis. Found: C, 56.59; H, 7.01%. Calculated for $C_{12}H_{18}O_4N_2$: C, 56.68; H, 7.14%.)

Ten grams (0.04 mole) of the pyrazoline derivative was mixed with 0.4 g. of Gattermann's copper powder and heated at 170–180° C., whereby the decomposition occurred with release of nitrogen. After completion of the denitrogenation, dimethyl trans,trans-chrysanthemum-dicarboxylate was obtained by vacuum-distillation, B.P. 115–122° C./4 mm., $n_D^{20}$ 1.4842, and which crystallized on standing, M.P. 78–9° C. The yield being 7.2 g. (81% of theory).

A mixture of 6.0 g. of the ester and 100 ml. of 10% alcoholic potassium hydroxide was boiled for about 2 hours. The hydrolysate was treated by the conventional manner to give trans,trans-chrysanthemum-dicarboxylic acid, M.P. 208° C., in almost quantitative yield.

EXAMPLE 6

With dimethyldiazomethane solution prepared from 33 g. (0.46 g.) of acetone-hydrazone and 120 g. of yellow mercuric oxide in dry xylene as Example 5, was reacted 30 g. (0.16 mole) of dimethyl α-methyl-trans-trans-muconate under the similar condition. After removal of mercury and mercurous oxide, the reaction product was, without isolating the pyrazoline derivative, added with copper powder and decomposed with heating. The distillation in vacuo gave the same dimethyl chrysanthemum-dicarboxylate with that obtained in Example 5 in even more satisfactory yield than the latter in which the pyrazoline derivative was once isolated. The yield was 16.5 g. (45% of theory).

EXAMPLE 7

The procedure of Example 6 is followed, except that diethyl α-methyl-trans,trans-muconate was used in the equivalent amount, instead of the methyl α-methyl-trans,trans-muconate. Diethyl trans,trans-chrysanthemum-dicarboxylate obtained has M.P. 34° C.

EXAMPLE 8

A toluene solution of dimethyldiazomethane was prepared using 16 g. of acetone-hydrazone in a manner like Example 5. To the solution cooled at −15° to −20° C. was added 4.5 g. of α-methyl-trans,trans-muconic acid with vigorous stirring. After additional 5 hours cooling and stirring, the solution was stood still for one night. The treatment of the reaction mass as like Example 6 gave diisopropyl trans,trans-chrysanthemum-dicarboxylate, B.P. 116–117° C./1 mm., $n_D^{11}$ 1.4748.

EXAMPLE 9

The procedure of Example 6 was repeated except that dimethyl α-methyl-cis,trans-muconate was substituted for dimethyl α-methyl trans,trans-muconate. Dimethyl trans,cis-chrysanthemum-dicarboxylate was obtained at B.P. 103–105° C./1 mm., $n_D^{28}$ 1.4758.

Hydrolysis of the ester as Example 5 gave trans,cis-chrysanthemum-dicarboxylic acid, M.P. 191° C. (from ethyl acetate). (Analysis. Found: C, 60.68; H, 7.38%. Calculated for $C_{10}H_{14}O_4$: C, 60.59; H, 7.12%.)

EXAMPLE 10

The procedure of Example 6 was repeated except that dimethyl α-methyl-cis,cis-muconate was substituted for dimethyl α-methyl trans,trans-muconate. Dimethyl trans,cis-chrysanthemum-dicarboxylate was obtained at B.P. 103–105° C./1 mm.

Hydrolysis of the ester as Example 5 gave trans,cis-chrysanthemum-dicarboxylic acid, M.P. 191° C.

EXAMPLE 11

The reaction mixture of dimethyl α-methyl-trans,trans-muconate with dimethyldiazomethane in xylene obtained as Example 5 was, after removal of mercury and mercurous oxide, evaporated in vacuo. The residue containing the pyrazoline derivative (II, R″ and R‴=Me) was heated slowly up to about 200° C., whereby the decomposition occurred with release of nitrogen. After completion of the denitrogenation, dimethyl trans,trans-chrysanthemum-dicarboxylate was obtained by vacuum-distillation, B.P. 115–122° C./4 mm.

EXAMPLE 12

The procedure of Example 6 was repeated except that the equivalent amount of diethyl α-methyl-cis,trans-muconate (or -cis,cis-muconate) was used in place of dimethyl α-methyl-trans,trans-muconate, and that the resulting reaction product containing the chrysanthemum-dicarboxylate was directly hydrolysed without isolating the ester, trans,cis-chrysanthemum-dicarboxylic acid, M.P. 191° C., was obtained.

EXAMPLE 13

To a solution of 30 g. of dimethyl trans,trans-crysanthemum-dicarboxylate in 300 ml. of absolute methanol was added an amount of 0.5 N methanolic potassium solution corresponding to the ratio of the ester to potassium of 1:1. After refluxing for 2 hours, the methanol was removed in vacuo. The residue was dissolved in water and extracted with ether to remove the ether-soluble unreacted ester (20 g.). The aqueous layer was acidified with 30% $H_2SO_4$ to pH 6–5 and again extracted with ether. The ether extract was, after removal of the ether and complete drying, extracted with petroleum ether (B.P. 60–70° C.). From the residue of the extract was obtained a fraction of B.P. 130–135° C./0.05 mm. in yield of 6 grams. Major part of the fraction is trans,trans-pyrethric acid.

EXAMPLE 14

Allethronyl trans,trans-pyrethrate was produced from allethrolone and trans,trans-pyrethric acid, the latter being obtained by the procedure of Example 13.

A mixture of trans,trans-pyrethric acid and thionyl chloride (1:1.5 equivalent) in chloroform was stood still for 24 hours. Then the solvent and excess of thionyl chloride were driven off in vacuo. This residue was, under cooling with ice-water, added with dry benzene, pyridine, and allethrolone each in an amount corresponding to 5 moles, 1 mole, and 0.8 mole equivalents per mole of the acid used. The reaction mixture was kept at room temperature for 24 hours. After the removal of pyridine hydrochloride and washing with water, then with aqueous sodium bicarbonate and again with water, the benzene solution was dried over anhydrous sodium sulfate. Benzene was removed in vacuo and the residue dissolved in petroleum ether (B.P. 40° C.) was purified by passing through an alumina column. The removal of petroleum ether left pale yellow allethronyl trans,trans-pyrethrate.

We claim:

1. A process for preparing esters of chrysanthemum-dicarboxylic acid comprising contacting a compound of the formula,

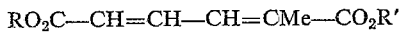

in which R and R' are respectively a member selected from the group consisting of hydrogen, and methyl and ethyl radicals, with dimethyldiazomethane, heating the resulting intermediate pyrazoline derivative until denitrogenation is substantially complete, and thereafter recovering the resulting ester of chrysanthemum-dicarboxylic acid.

2. A process for preparing chrysanthemum-dicarboxylic acid comprising contacting a compound of the formula,

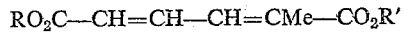

in which R and R' are respectively a member selected from the group consisting of hydrogen, and methyl and ethyl radicals, with dimethyldiazomethane, heating the resulting intermediate pyrazoline derivative until denitrogenation is substantially complete, directly subjecting the reaction product to hydrolysis, and then recovering chrysanthemum-dicarboxylic acid from the hydrolysed solution.

3. The process according to the claim 1 wherein the heating of the intermediate pyrazoline derivative is carried out in the presence of copper powder.

4. The process according to the claim 1 wherein said compound is dimethyl α-methylmuconate.

5. The process according to the claim 1 wherein said compound is diethyl α-methylmuconate.

6. The process according to the claim 1 wherein said compound is α-methylmuconic acid.

7. The process according to the claim 4 wherein said compound is dimethyl α-methyl-trans,trans-muconate.

8. The process according to the claim 4 wherein said compound is dimethyl α-methyl-cis,trans-muconate.

9. The process according to the claim 4 wherein said compound is dimethyl α-methyl-cis,cis-muconate.

References Cited in the file of this patent
UNITED STATES PATENTS
2,727,900   Shukys et al. _____ Dec. 20, 1955

OTHER REFERENCES
Crombie et al.: J. Chem. Soc. (London), pages 2743–2748 (1957).